(12) United States Patent
Sanghera et al.

(10) Patent No.: US 7,295,740 B2
(45) Date of Patent: Nov. 13, 2007

(54) HIGH AIR FRACTION PHOTONIC BAND GAP FIBERS

(75) Inventors: Jasbinder S Sanghera, Ashburn, VA (US); Pablo C Pureza, Burke, VA (US); Frederic H Kung, Alexandria, VA (US); Daniel Gibson, Greenbelt, MD (US); Leslie Brandon Shaw, Woodbridge, VA (US); Ishwar D Aggarwal, Farifax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/623,359

(22) Filed: Jan. 16, 2007

(65) Prior Publication Data

US 2007/0110377 A1 May 17, 2007

Related U.S. Application Data

(60) Division of application No. 10/904,062, filed on Oct. 21, 2004, which is a continuation-in-part of application No. 10/632,210, filed on Aug. 1, 2003, now Pat. No. 6,993,230.

(51) Int. Cl.
*G02B 6/02* (2006.01)
(52) U.S. Cl. .................. 385/125; 385/123; 385/122; 385/141
(58) Field of Classification Search ............. 385/123, 385/122, 124, 125, 126, 127, 128, 141
See application file for complete search history.

(56) References Cited

U.S. PATENT DOCUMENTS

| | | | |
|---|---|---|---|
| 5,802,236 A | 9/1998 | DiGiovanni et al. | 385/127 |
| 6,444,133 B1 | 9/2002 | Fajardo et al. | 216/24 |
| 6,539,155 B1 | 3/2003 | Broeng et al. | 385/125 |
| 6,631,234 B1 | 10/2003 | Russell et al. | 385/125 |
| 6,705,126 B2 | 3/2004 | Paek et al. | 65/395 |
| 6,847,771 B2 | 1/2005 | Fajardo et al. | 385/125 |
| 6,993,230 B2 | 1/2006 | Sanghera et al. | 385/125 |
| 7,099,533 B1 * | 8/2006 | Chenard | 385/31 |
| 7,242,835 B2 * | 7/2007 | Busse et al. | 385/125 |
| 2002/0150367 A1 | 10/2002 | Gallagher | 385/125 |

(Continued)

OTHER PUBLICATIONS

Kaneshima et al., "Numerical Investigation of Octagonal Photonic Crystal Fibers with Strong Confinement Field," IEICE Trans. Electron., vol. E89-C, No. 6, pp. 830-837 (Jun. 2006).

Solli et al., "Missing Gaps in Photonic Crystals," Annals of Optics, XXIX ENFMC, (2006).

Saitoh et al., "Air-Core Photonic Band-Gap Fibers: the Impact of Surface Modes," Optical Society of Am., vol. 12, No. 3, pp. 1-7, (Feb. 2004).

Shaw, et al., "As-S and As-Se Based Photonic Band Gap Fiber for IR Laser Transmission," Optics Express, vol. 11, No. 25, pp. 3455-3460 (Dec. 2003).

Ouzounov, et al. "Generation of Magawatt Optical Solutions in Hollow-Core Photonic Band-Gap Fibers," Science, vol. 301, pp. 1702-1704 (Sep. 2003).

*Primary Examiner*—Brian M. Healy
(74) *Attorney, Agent, or Firm*—John J. Karasek; Rae Lynn P. Guest

(57) ABSTRACT

A photonic band gap fiber and method of making thereof is provided. The fiber is made of a non-silica-based glass and has a longitudinal central opening, a microstructured region having a plurality of longitudinal surrounding openings, and a jacket. The air fill fraction of the microstructured region is at least about 40%. The fiber may be made by drawing a preform into a fiber, while applying gas pressure to the microstructured region. The air fill fraction of the microstructured region is changed during the drawing.

10 Claims, 4 Drawing Sheets

U.S. PATENT DOCUMENTS

| | | | |
|---|---|---|---|
| 2003/0161599 A1 | 8/2003 | Broderick et al. | 385/125 |
| 2003/0230118 A1 | 12/2003 | Dawes et al. | 65/379 |
| 2003/0231846 A1 | 12/2003 | Fajardo et al. | 385/125 |
| 2004/0050110 A1 | 3/2004 | Berkey et al. | 65/393 |
| 2004/0071423 A1 | 4/2004 | Libori et al. | 385/127 |
| 2004/0096173 A1 | 5/2004 | Fekety et al. | 385/125 |
| 2004/0105641 A1 | 6/2004 | Russell et al. | 385/125 |
| 2004/0151454 A1 | 8/2004 | Fajardo et al. | 385/126 |
| 2004/0228592 A1 | 11/2004 | Gaeta et al. | 385/125 |
| 2005/0025965 A1 | 2/2005 | Sanghera et al. | 428/364 |
| 2005/0074215 A1 | 4/2005 | Sanghera et al. | 385/125 |
| 2006/0251369 A1* | 11/2006 | Shaw et al. | 385/125 |
| 2007/0014528 A1* | 1/2007 | Busse et al. | 385/139 |
| 2007/0110377 A1* | 5/2007 | Sanghera et al. | 385/123 |
| 2007/0147757 A1* | 6/2007 | Shaw et al. | 385/125 |

OTHER PUBLICATIONS

Bouwmans et al., "Properties of a hollow-core photonic bandgap fiber at 850 nm wavelength," Optics Express, vol. 11, No. 14, pp. 1613-1620 (Jul. 14, 2003).

Sanghera et al., "Infrared Fibers for Missile Jamming," Energetic Particles, Plasmas, and Beams, pp. 127-129 (Sep. 2002).

Lin, et al., "Photonic Band Gap Fiber Accelerator," The American Physics Society, vol. 4, pp. 051301/(1)-(7) (2001).

Cregan, et al., "Single-Mode Photonic Band Gap Guidance of Light in Air," Science, vol. 285, pp. 1537-1539 (Sep. 1999).

Barkou et al., "Silica-Air Phontoic Crystal Fiber Design That Permits waveguiding By a True Photonic Bandgap Effect," Optical Soc. of Am., vol. 24., No. 1, pp. 46-48 (Jan. 1999).

* cited by examiner

HIGH AIR FRACTION PHOTONIC BAND GAP FIBERS

This application is a divisional of U.S. patent application Ser. No. 10/904,062, filed Oct. 21, 2004, (pending) which is a continuation-in-part application of U.S. patent application Ser. No. 10/632,210, filed on Aug. 1, 2003, now U.S. Pat. No. 6,993,230, issued Jan. 31, 2006, which is incorporated herein by reference.

BACKGROUND OF THE INVENTION

1. Field of the Invention

The invention relates generally to high air-fraction non-silica-based glass fibers.

2. Description of the Prior Art

Hollow core photonic band gap (HC-PBG) fibers have been fabricated from silica glass and reported in the literature (Cregan et al., "Single-mode photonic band gap guidance of light in air," *Science,* 285(5433), 1537-1539 (1999); Barkou et al., "Silica-air photonic crystal fiber design that permits waveguiding by a true photonic bandgap effect," *Optics Letters,* 24(1), 46-48 (1999); Venkataraman et al., "Low loss (13 dB/km) air core photonic band-gap fibre," ECOC, Postdeadline Paper PD 1. 1, Sep., 2002. All referenced publications and patents are incorporated herein by reference). FIG. 1 shows a schematic of the cross-section of a HC-PBG fiber. The periodic layered structure of holes and glass creates a photonic band gap that prevents light from propagating in the structured region (analogous to a 2D grating) and so light is confined to the hollow core. Typically, the periodicity of the holes is on the scale of the wavelength of light and the outer glass is used for providing mechanical integrity to the fiber. The fact that light travels in the hollow core also means that the losses will be lower so longer path lengths can be used. Also, non-linear effects will be negligible and damage thresholds will be higher so that higher power laser energy can be transmitted through the fiber for military and commercial applications. Also, since light is guided in the hollow core, an analyte disposed therein will have maximum interaction with light, unlike traditional evanescent sensors.

The periodicity of the holes, the air fill fraction and the refractive index of the glass dictate the position of the photonic band gap or gaps, namely the transmission wavelengths guided through the hollow core. PBG fibers are obtained by first making a microstructured preform and then drawing this into fiber with the correct overall dimensions. In some cases, the air fraction needed in the fiber, and therefore preform, is as high as 90% or even higher to provide a photonic band gap. An example includes chalcogenide glass PBG fiber for transmission in the infrared region beyond 2 µm. Irrespective of the technique used to make the preform, it is very difficult to make high air fraction preforms, especially from specialty glasses such as chalcogenides, halides, chalcohalides, and the like. Unlike silica, which is a relatively strong material, specialty oxide and non-oxide glasses may be weaker and become difficult to fabricate, and moreover, difficult to handle when the air fraction is so high. Consequently, there needs to be a technique suitable for making high air fraction fiber, from specialty glasses.

SUMMARY OF THE INVENTION

One aspect of the invention provides a method of making a fiber. A preform comprising a non-silica-based glass is provided. The preform is cylindrical, having a longitudinal central opening and a microstructured region comprising a plurality of longitudinal surrounding openings disposed around the central opening. The diameter of the central opening is larger than the diameter of any surrounding opening that is adjacent to the central opening. The surrounding openings are pressurized with a gas. The preform is drawn into a fiber at an elevated temperature while maintaining the gas pressure to retain the longitudinal central opening and the microstructured region. The air fill fraction of the microstructured region of the fiber is different from the air fill fraction of the microstructured region of the preform.

Another aspect of the invention provides a fiber comprising non-silica-based glass. The fiber comprises a longitudinal central opening, a microstructured region comprising a plurality of longitudinal surrounding openings disposed around the central opening, and a jacket surrounding the microstructured region. The air fill fraction of the microstructured region is at least about 40%.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Figure 1:
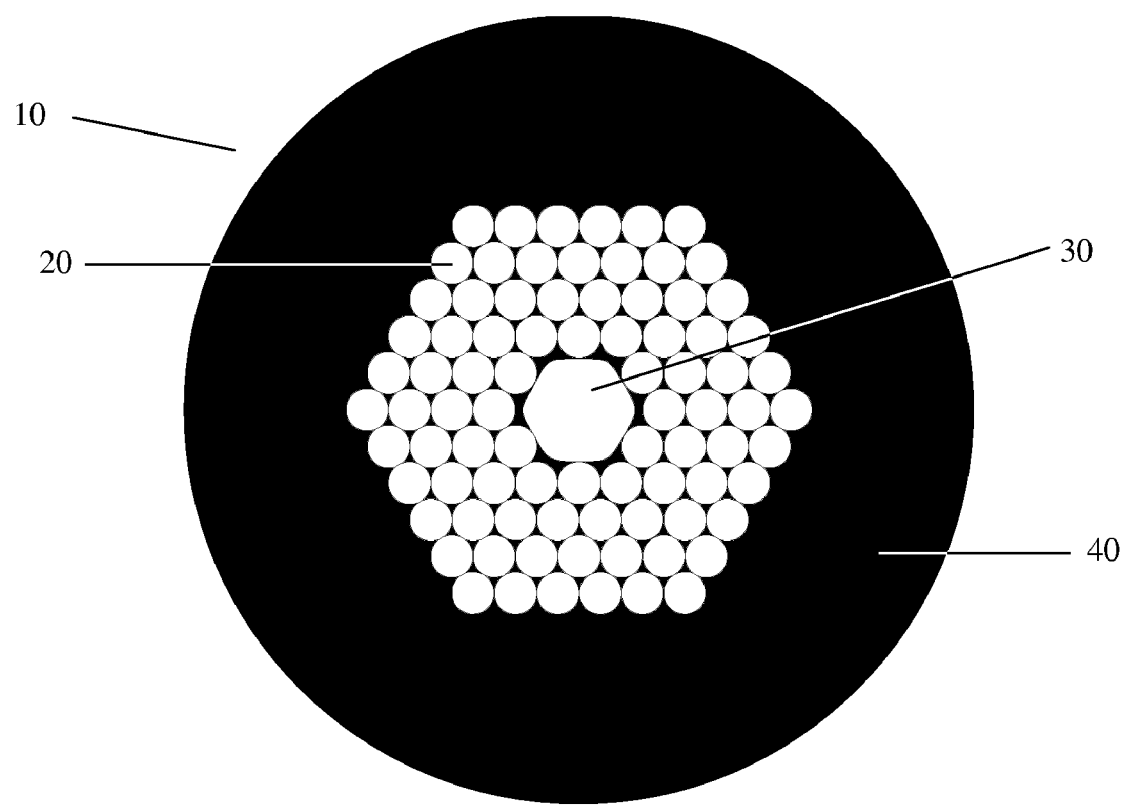
FIG. 1 shows a cross-section of a PBG fiber.

In the absence of any gas pressure above the holes, the hole diameters can collapse slightly or completely depending upon the fiber draw temperature and draw rate. For example, at higher temperatures, the viscosity may be sufficiently low so that surface tension dominates and leads to a reduction in the hole diameter. Silica PBG fibers are typically drawn from a preform made by stacking tubes. Before fiber drawing, the tube ends are sealed through fusion or placement of some blocking agent. During fiber drawing, the gas inside the sealed tubes gets hot and builds up pressure. However, the gas pressure increases continuously with time as the preform gets shorter. Consequently, the hole diameters increase continuously in size without control. This is not a good situation for making uniform quality PBG fiber since the band gap, and therefore the transmitted wavelength, will vary along the length of the fiber.

However, leaving the holes open before and during fiber drawing, it is possible to apply a constant pressure above the holes using gas flow to maintain a constant hole diameter, and moreover, the hole size can be increased in a controlled manner by increasing the gas pressure. Hence, the air fraction can be increased to over 90% in the fiber starting with a microstructured preform with considerably less air fraction (for example, 30%). From a practical perspective, it is relatively easier to make and handle a microstructured preform with only 30% air fraction.

In the first step in the method of the invention, a preform comprising a non-silica-based glass, also known a specialty glass, is provided. Suitable glasses include, but are not limited to, chalcogenide glass, germanate glass, phosphate glass, tellurite glass, borate glass, antimonate glass, and halide glass.

The preform 10 is cylindrical. As used herein, the term "cylindrical" is not limited to round structures, but also refers to preforms having substantially the same perpendicular outside cross-section along the entire length of the preform, or along the length of the preform that is to be drawn into a fiber. The preform may include head or tail portions that do not have the same cross-section, or any other stated characteristic, that is otherwise stated to run the length of the preform, as long as the characteristic is present in the portion of the preform that is to be drawn into a desired fiber. Example cylinders include, but are not limited to, a normal round cylinder and a hexagonal cylinder, with smooth sides or with sides made of half circles.

The preform has a longitudinal central opening or hole 30 that runs the length of the preform, which is hollow. The central opening may or may not be centered in the preform. Surrounding the central opening and running the length of the preform is a microstructured region comprising a plurality of hollow, longitudinal central openings 20. The microstructured region may or may not be radially symmetrical. Certain surrounding openings are adjacent to the central opening in that they are in a first layer of openings around the central opening. This layer is between the central opening and any non-adjacent surrounding openings. For example, when the microstructured region is a hexagonal arrangement of surrounding openings, the adjacent openings are those in the hexagon immediately surrounding the central opening.

The preform is constructed so that the central opening is larger in diameter than that of any of the adjacent surrounding openings. In some embodiments, all the surrounding openings are approximately the same size. For example, they may be made from the same kind of tubing, which inherently has a certain range in its size from point to point due to imperfect manufacturing, but is considered to be approximately the same size at all points. In some of these embodiments, the central opening has at least two times the diameter of the surrounding openings.

In some embodiments, the preform also comprises a jacket material 40 comprising the non-silica-based glass. The jacket can help to protect the potentially fragile microstructured region of both the preform and the fiber and provide mechanical integrity.

Figure 2:
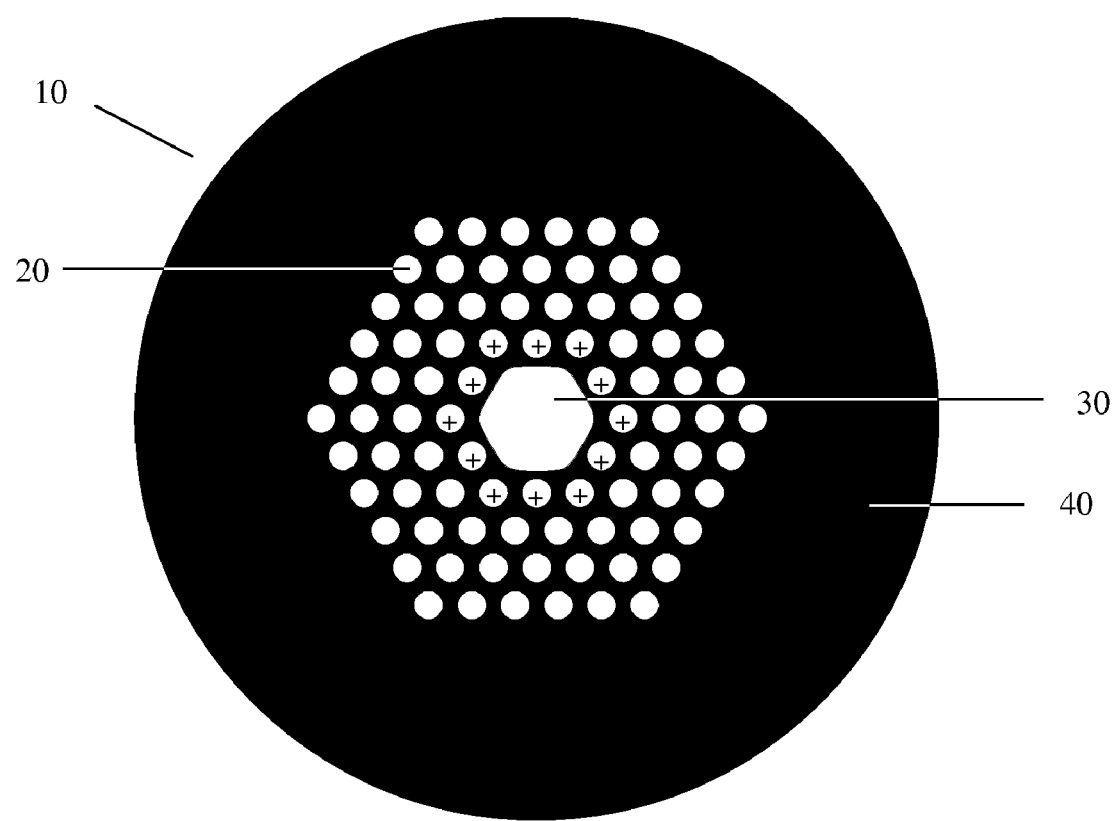
FIG. 2 shows a cross-section of a preform.

A cross-section of a suitable preform is shown in FIG. 2. The preform 10 can be made by stacking tubes of the same size in a hexagonal structure, leaving seven tubes missing in the center to form the central opening 30. A larger tube may also be inserted into the central opening to define a round opening or an opening of another shape. The entire stack is placed inside a hollow jacket, and the entire assembly fused together. The fusing can substantially eliminate the interstitial voids between tubes with a circular outer diameter. Alternatively, tubes with a hexagonal outer diameter may be used so that there are no voids between the tubes. The adjacent openings are indicated by the "+" symbols. FIG. 1 shows the cross-section of a fiber 15 that may be made from the preform of FIG. 2. The air faction of the preform may be 41% compared to an 87% air fraction of the fiber. It is to be understood that fabrication of the PBG preforms using the tube stacking technique is only one example of fabricating these microstructured preforms. Other techniques could be used to fabricate the PBG preforms.

In the second step, the central opening and surrounding openings are pressurized with a gas. This can be done with a gas supply assembly attached to one end of the preform and the other end of the preform positioned above a fiber draw furnace. The gas can be the same or different gases in different openings. Suitable gases include, but are not limited to, inert gases, nitrogen, argon, and helium. An inert gas can be used to maintain a passive environment during processing. Alternatively, a reactive gas can be used to purify the surface of the openings or modify the composition on the inside surface of the openings, thereby adjusting properties such as refractive index, and/or the physical and thermal properties. The gas pressure in the central opening may be controlled independently from and may be less than the gas pressure in the surrounding openings. Consequently, the ratio of the respective hole diameters can be modified in a controlled manner.

In the third step of the invention, the preform is drawn into a fiber. Note that the steps of pressuring and drawing occur concurrently, with the possibility that either step can begin first. The drawing is done at an elevated temperature so that the glass is softened. The gas pressure maintains and prevents the collapse of the central opening and the surrounding openings of the microstructured region. The gas pressure can be controlled at a substantially constant pressure during the drawing step, so that the resulting fiber has substantially the same cross-section along its length.

The whole fiber drawing furnace can be located inside an inert atmosphere if drawing specialty glasses where atmospheric control is important (e.g. chalcogenides and halides). Furthermore, the fiber drawing assembly can be isolated from environmental contaminants such as dust and other extraneous particles, which might have a detrimental impact on fiber strength and/or optical properties. The preform can be lowered into the furnace at a known rate while the temperature is gradually increased from a predetermined temperature to prevent thermal shock of the preform. Once the temperature is sufficiently high, for example corresponding to a glass viscosity in the range of about $10^4$ to $10^6$ Poises, the preform will soften and be drawn into fiber with considerably smaller dimensions than the starting preform.

Figure 3:
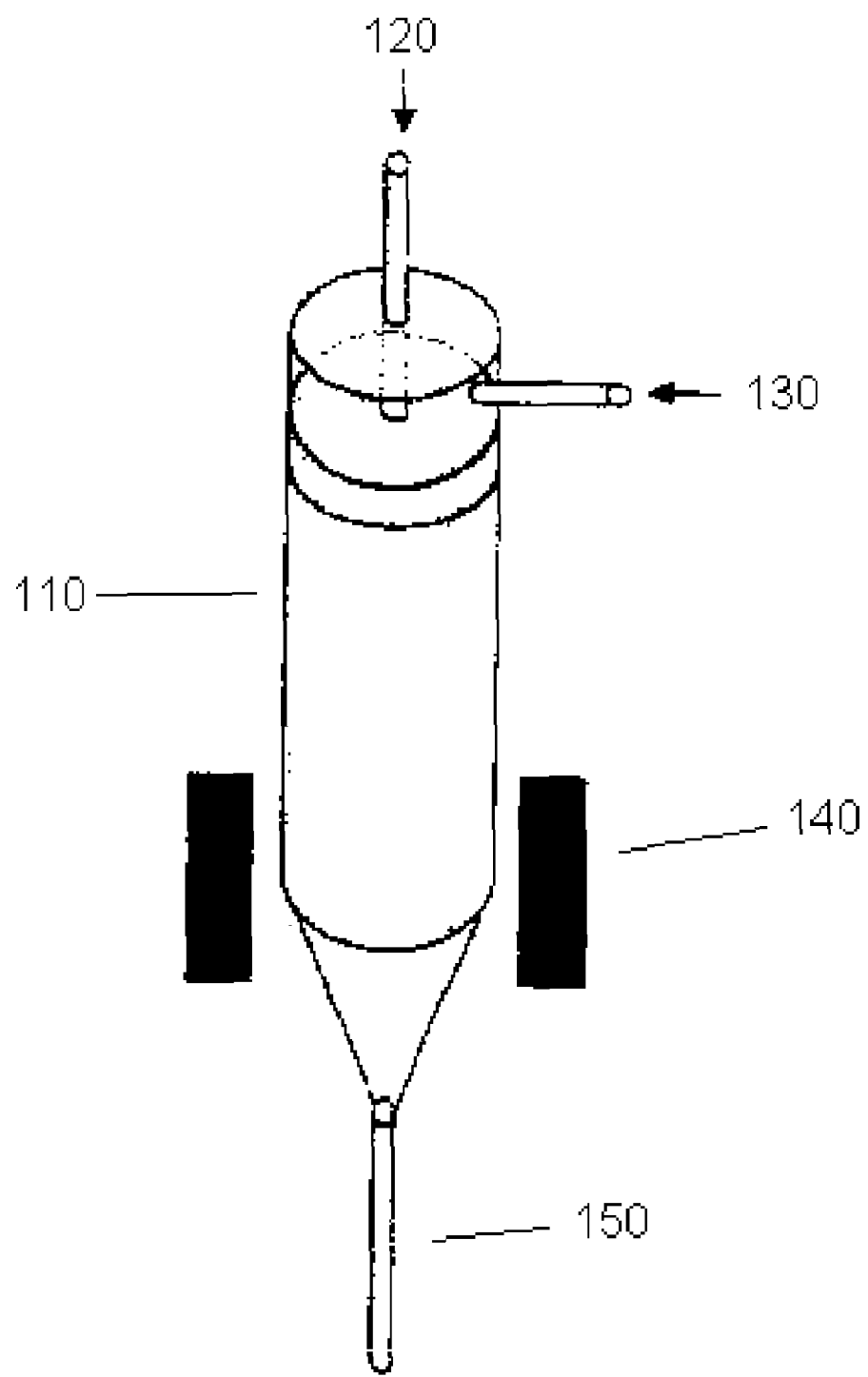
FIG. 3 schematically illustrates an apparatus for drawing a fiber.

FIG. 3 schematically illustrates a pressurizing and drawing apparatus. The preform 110 has gas pressure 120 flowing directly into the central opening, and another source of gas pressure 130 over the microstructured region. The gas pressure 120 may flow through a tube inserted into the central opening, without any need to enlarge the openings. The preform 110 is lowered into a fiber draw furnace 140, from which it emerges as a fiber 150.

The gas pressure or pressures are chosen so that the air fill fraction of the microstructured region is different in the fiber from what it is in the preform, as opposed to merely maintaining the same air fill fraction and preventing collapse of the openings. The air fill fraction can be increased by the drawing step and may be raised to at least as high as 40%, 70%, or 90%, depending on the air fill fraction of the preform. It is also possible to apply pressure to the preform before the fiber drawing to modify the size of the holes in the preform. The required air pressure to change the air fill fraction or even just to prevent collapse of the holes can be different than it would be if the glass were silica, as the surface tension and viscosity of the non-silica glasses can be different.

The resulting fiber 15 has a structure similar to the preform 10, with a central opening 30, a microstructured region including a plurality of holes 20, and a jacket 40. The microstructured region can have an air fill fraction of at least as 40%, 70%, or 90%. The diameter of the fiber may be, but is not limited to, in a range of 80-1000 µm in diameter. For example, the diameter of the microstructured preform could be greater than 10 mm whereas the fiber diameter could be less than 200 μm.

The structure of the fiber can cause it to have the properties of a photonic bandgap fiber. Light of a wavelength in the band gap can propagate through the fiber, while being confined to the central opening. The microstructured region can prevent all or most of the light from passing through the glass, including any layer of glass that may be between the central opening and the adjacent surrounding openings. The band gap may be centered at a wavelength that is in the infrared, such as longer than 2 microns and as long as 15 microns.

The exact air fraction and periodicity in the final fiber will be controlled by the temperature, viscosity of the glass, fiber draw rate, and gas pressure. This assumes that the feed rate of the preform into the hot zone is fixed at a predetermined rate, which is typical in fiber drawing. It is possible to modify and control the air fraction and periodicity along with the overall fiber diameter, thereby controlling the photonic band gap. Another consequence at high air fraction is that the holes may no longer be round, but instead more hexagonal. This does not necessarily have a detrimental impact on the PBG properties.

Example uses of the fiber include, but are not limited to, facility clean up, biomedical analysis (e.g. glucose, blood, breath), CBW agent detection, toxic and hazardous chemical detection, and environmental pollution monitoring and process control. In addition to chemical sensing, the PBG fibers can be used for very high laser power delivery since the light is predominantly guided in the hollow core, unlike in traditional fibers, which possess a solid core that can be damaged at high powers. This may have a positive and enabling impact in next generation high power infrared missile warning systems. Further benefits of PBG fibers include reducing system complexity, weight and cost as well as enabling remoting of high power lasers for cutting, welding, and metrology, as well as laser surgery, cancer removal and glaucoma treatment. Infrared lasers for biomedical applications include the $CO_2$ laser where powers including, but not limited to, 10 to 50 W are needed and cannot be transmitted using current solid core fibers.

Having described the invention, the following examples are given to illustrate specific applications of the invention. These specific examples are not intended to limit the scope of the invention described in this application.

EXAMPLE 1

Single tube—A single glass tube made from $As_{39}S_{61}$ glass was drawn to a fiber under 2.8 in $H_2O$ gas pressure inside the tube. The ratio of the hole diameter to the outer diameter of the tube was increased considerably in the fiber by increasing the pressure in the hole during drawing. The air fraction was increased from 32% to 85% in this example. It can be even larger (>90%) depending upon the viscosity, temperature, draw rate, and pressure. The uniformity and concentricity was not compromised by this process.

EXAMPLE 2

Preform—This example pertains to a microstructured preform made from $As_{39}S_{61}$ glass having a large central opening and 12 surrounding openings in a single hexagonal configuration (3 openings per edge of the hexagon). The preform was placed on the fiber draw tower and attached to gas pressurizing assembly. The preform was heated up to 310° C. when it softened and fiber drawing was initiated. The pressure above the microstructured preform was changed and this caused changes to the hole diameters. The central core was open to the atmosphere. Increasing the pressure increased the hole size and therefore air fraction in the fiber. For example, without gas pressure, the microholes in the fiber were about 6 μm in diameter. However, the application of a nitrogen gas pressure equivalent to 2 in $H_2O$ increased the micro-hole diameter to about 23 μm. The initial size of the microholes in the preform was about 1 mm diameter. This preform did not possess an optimized photonic band gap structure, but nevertheless, this example highlights that real time changes to the hole diameters, and therefore air fraction, was made during fiber drawing.

EXAMPLE 3

Figure 4A:
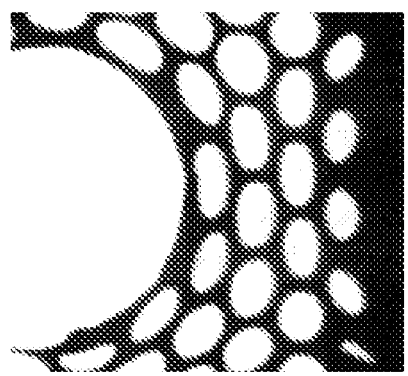
FIG. 4 shows the cross-section of fibers drawn at different gas pressures.
Figure 4B:
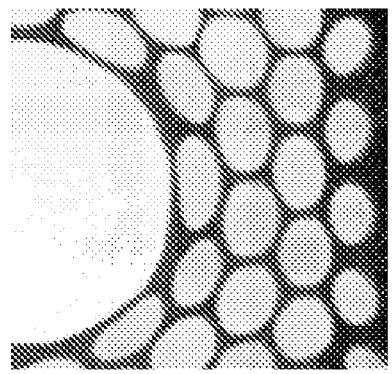
Figure 4C:
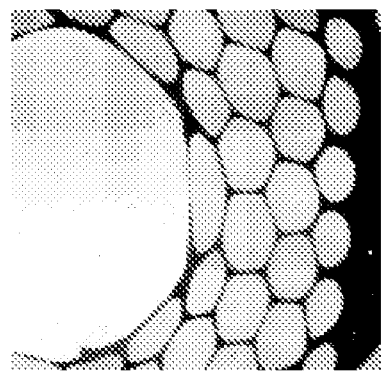

Increased gas pressure—This example shows how the air fraction of a microstructured preform, containing several layers of holes, can be increased by using gas pressure applied uniformly to the central opening and surrounding openings during fiber drawing. The glass was $As_{39}S_6$ and the air fill fraction of the microstructured region of the preform was 74%. FIGS. 4(a)-(c) show pictures of microstructured fibers that were drawn using different pressures. FIG. 4(a) was generated with no gas pressure and resulted in an air fill fraction of 47%. FIG. 4(b) was generated with 1 in $H_2O$ of $N_2$ in both the microstructured region and the central opening, and resulted in an air fill fraction of 58%. Pressure of 2 and 3 in $H_2O$ of $N_2$ resulted in air fill fractions of 67% and 69% respectively. FIG. 4(c) was generated with 4 in $H_2O$ of $N_2$ and resulted in an air fill fraction of 78%. It is clearly evident that increasing the pressure to 4 in $H_2O$ increased the air fraction as noted by the thinner webbing between the holes. It is estimated that a pressure of 3.4 in $H_2O$ would result in no change to the air fill fraction. Even though this is not an optimized PBG design, it is quite clear that gas pressure can be used to increase the air fraction in the fiber.

EXAMPLE 4

Separate gas pressures—This example pertains to a microstructured preform made from an arsenic selenide-based glass having a large central opening and 84 surrounding openings in a hexagonal configuration, surrounded by a jacket tube. The air fraction of the microstructured region of the preform was 19% and the ratio of the central opening diameter to the surrounding opening pitch was 2.3. In this example, separate gas pressures were applied to the central opening and the group of 84 surrounding openings, during the fiber draw. Pressures of 0 and 15 in $H_2O$ of $N_2$ applied to the central and surrounding openings respectively generated a fiber with air fraction of 14% and a ratio of central opening diameter to surrounding opening pitch of 2.2. Pressures of 0 and 25 in $H_2O$ of $N_2$ applied to the central and surrounding openings respectively generated a fiber with air fraction of 24% and a ratio of central opening diameter to surrounding opening pitch of 2.4. This fiber did not possess an optimized photonic bandgap structure, but nevertheless, this example highlights that the diameters of the surrounding openings, and therefore air fraction, can be changed separately from the diameter of the central opening by applying separate gas pressures to the surrounding openings as a group, and the central opening during fiber drawing.

Obviously, many modifications and variations of the present invention are possible in light of the above teachings. It is therefore to be understood that the claimed invention may be practiced otherwise than as specifically described.

What is claimed is:

1. A photonic band gap fiber, comprising:
   a non-silica-based glass defining a longitudinal central hole and a plurality of surrounding holes;
   a structured region, wherein the structured region includes all of the surrounding holes and the non-silica glass therebetween and wherein the structured region is disposed around the central hole; and
   a jacket of non-silica based glass, wherein the jacket surrounds the structured region;
   wherein the structured region has an air fill fraction of at least about 40%, wherein the air fill fraction is a ratio of air space to space occupying air and non-silica based glass.

2. The fiber of claim 1, wherein the structured region has an air fill fraction of at least about 70%.

3. The fiber of claim 1, wherein the structured region has an air fill fraction of at least about 90%.

4. The fiber of claim 1, wherein the non-silica-based glass is a chalcogenide glass.

5. The fiber of claim 1, wherein the non-silica-based glass is selected from the group consisting of chalcogenide glass, germanate glass, phosphate glass, tellurite glass, borate glass, antimonate glass, and halide glass.

6. The fiber of claim 1, wherein the fiber has a diameter of about 80 microns to about 1000 microns.

7. The fiber of claim 1, wherein the fiber is a photonic band gap fiber having a photonic band gap centered beyond a wavelength of about 2 microns.

8. The fiber of claim 7, wherein the band gap lies within the wavelength region of from about 2 microns to about 15 microns.

9. The fiber of claim 1, wherein a cross section of the structured region includes a cross section of each of the surrounding holes, wherein each cross section of the surrounding holes are substantially identical.

10. The fiber of claim 1, wherein the structured region of the fiber has a first air fill fraction which is larger than a second air fill fraction of a second structured region of a preform from which the fiber is drawn.

* * * * *